March 8, 1938.  A. THAON  2,110,563
AIRCRAFT OF THE AUTOGYRO TYPE
Filed June 22, 1935  3 Sheets-Sheet 3
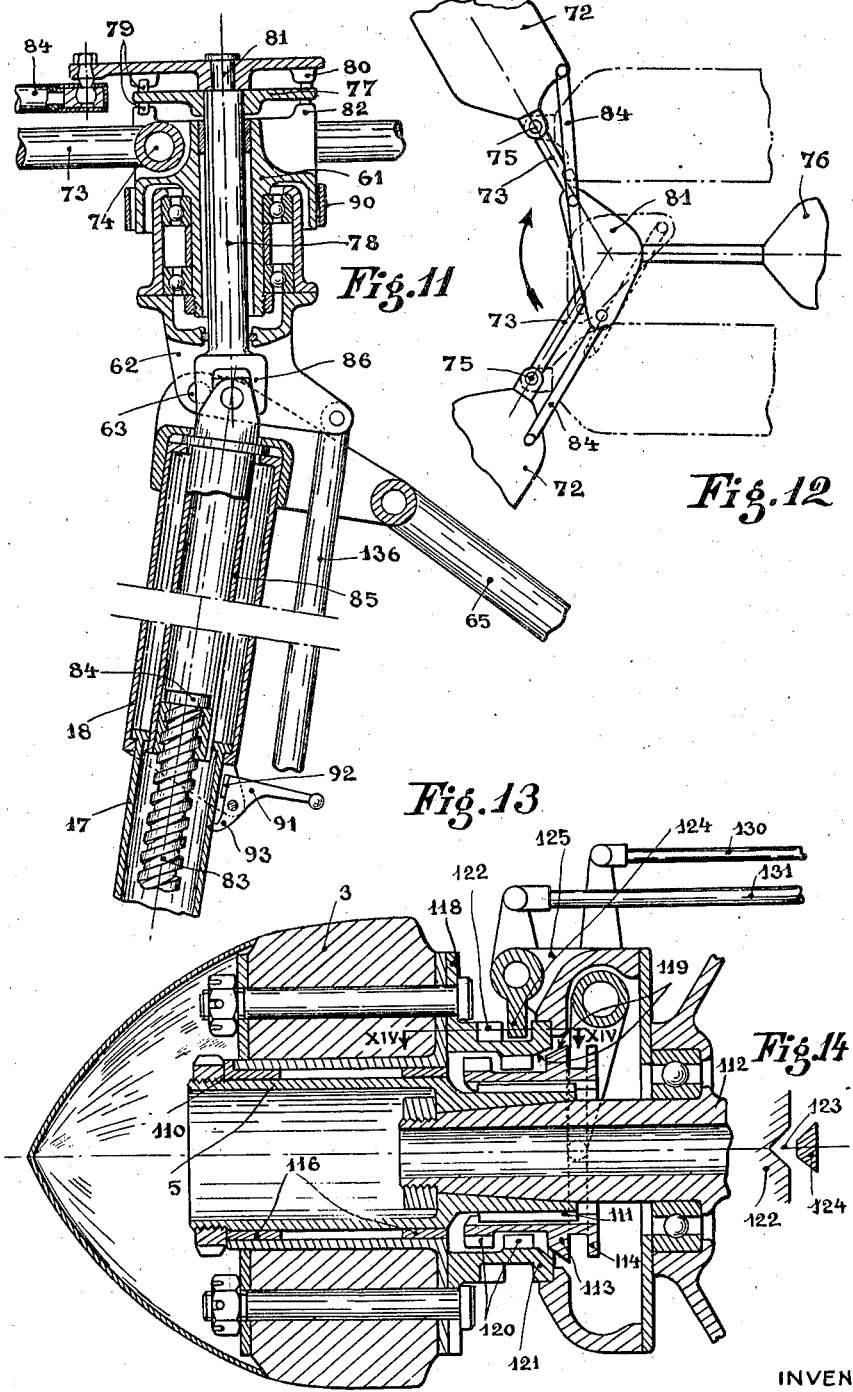
INVENTOR
André Thaon
BY
ATTORNEYS Patented Mar. 8, 1938

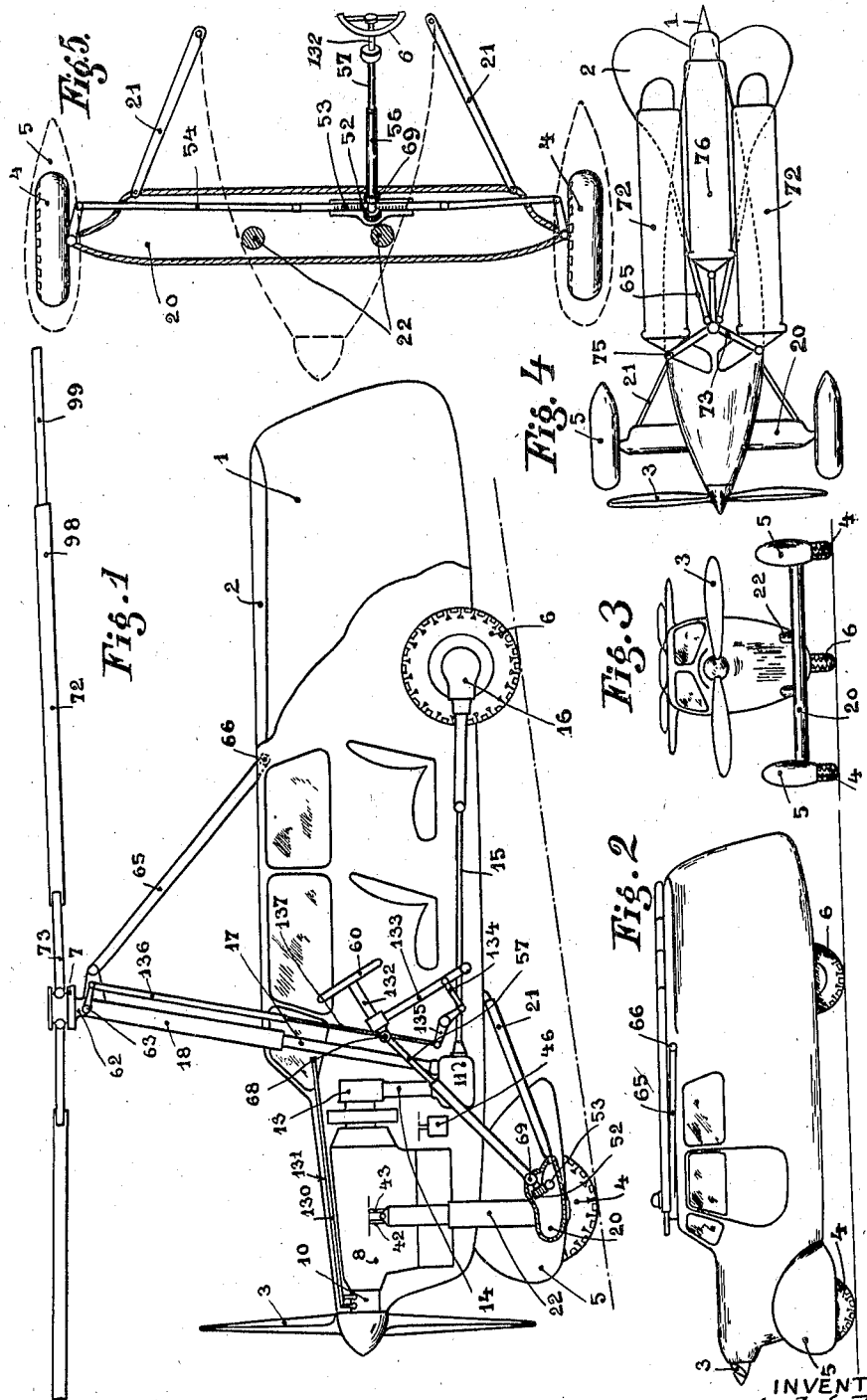

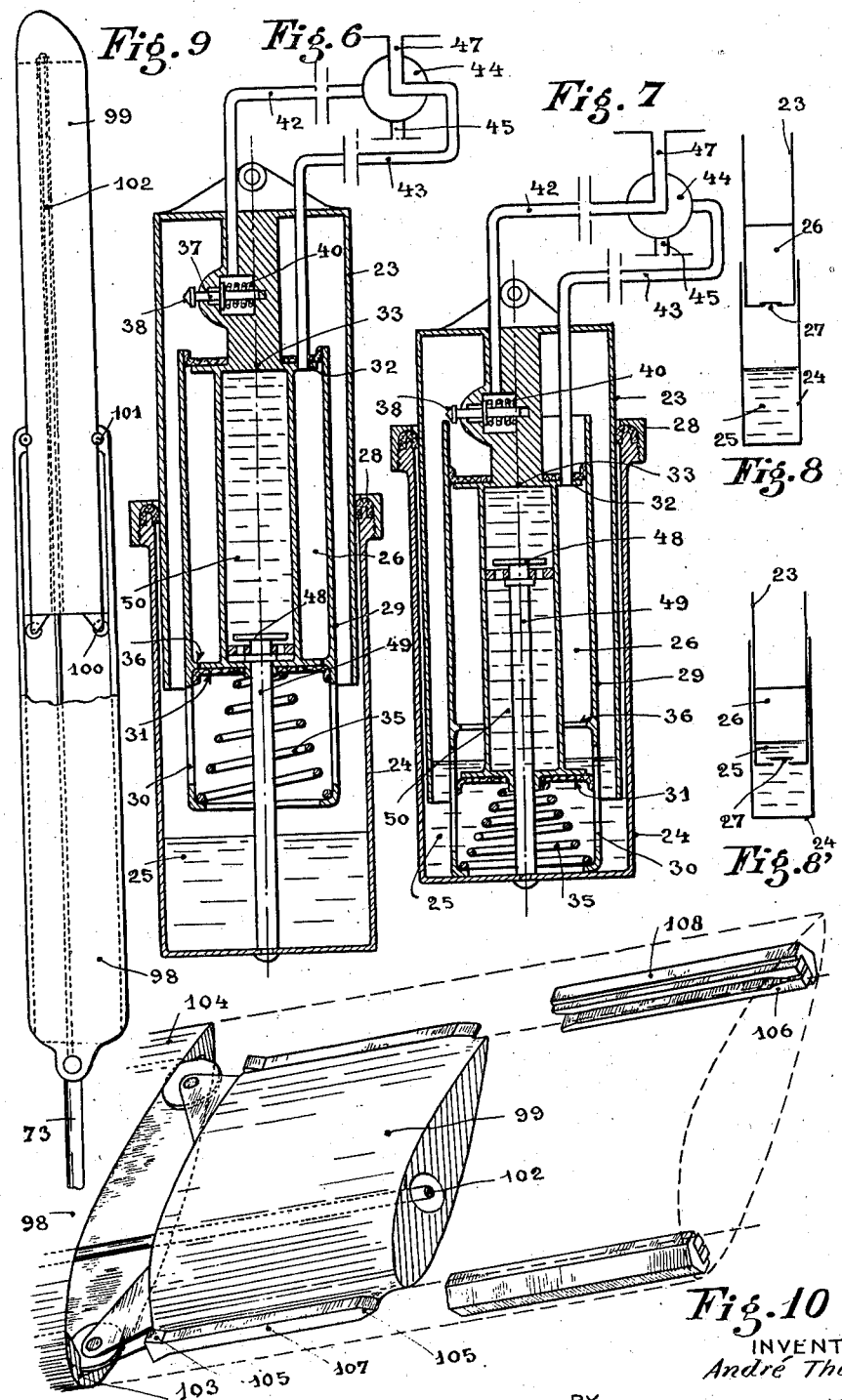

2,110,563

UNITED STATES PATENT OFFICE 2,110,563

AIRCRAFT OF THE AUTOGYRO TYPE

André Thaon, St.-Cloud, France

Application June 22, 1935, Serial No. 27,850
In Luxembourg June 25, 1934

9 Claims. (Cl. 244—18)

The present invention relates to an aircraft of the autogyro type and has for its object to provide an apparatus of this nature adapted for travel upon roads.

This apparatus comprises at least one driving wheel disposed preferably on the rear, at least one guide wheel and preferably a pair of guide wheels, and is adapted to be reduced in size for the purpose of operating as a road vehicle.

This result is obtained by the use of several particular characteristic dispositions by which the apparatus can be rapidly changed over from one use to the other. All of these dispositions are preferably employed in combination but a certain number of the same may be used separately, even in an apparatus differing from the one which will be hereinafter described, and without departing from the spirit of the invention.

A first series of particular dispositions of the apparatus relates to the landing gear, and this, according to the invention, is so aranged that the apparatus may occupy two positions, a low and horizontal position for road travel and a second position which is inclined to the horizontal in order to facilitate the starting and the landing.

The wheels of the landing gear are guide wheels and are preferably arranged in such way that their direction may serve both on the road and in flight, owing to a suitable streamline device by which they are transformed into rudders. They are preferably mounted on an axle which is combined with steering gear and are located at the ends of extensible posts substantially vertical.

In a preferred form of construction, the said extensible posts are so arranged as to permit the rapid change-over from one position of the apparatus to the other with reference to its landing gear, and to assure for said respective positions either a suspension termed "road suspension" or a suspension termed "flight suspension" for the flight and the landing which has different characteristics from the aforesaid.

According to the invention, the said posts providing for a pneumatic suspension by the displacement of a piston in a cylinder chamber containing compressed air, said cylinder chamber forms a casing termed primary casing which is variable according to the length of the post, and in which is located a second casing of constant volume or secondary casing the passage of the gas from the primary casing into the secondary casing being allowed when the post is in the road position and being cut off when the post is in the flying position.

According to another feature of the invention, a certain quantity of liquid is placed in the said cylinder chamber.

In a preferred construction of the said post, it consists of a cylinder in which is slidable a tubular piston and a tube located within the said cylinder serves to form the aforesaid secondary casing, the passage of the gas from said cylinder and the secondary casing being cut off when the post is brought into the flying position by means of a valve device secured to the said piston.

Preferably a clack-valve, controlled by the position of the piston with reference to the cylinder, maintains the post in its road position, and the said valve will open and provide for an admission of air when the length of the post becomes reduced below the lower limit which it determines.

The control is preferably effected by means of a three-way cock which is mounted within reach of the pilot and is connected to said valve.

A second series of particular arrangements in the apparatus according to the invention relates to the rotor, and the latter, in order to insure the proper stability of the vehicle on the road and to reduce the general size, is vertically movable, and it can thus take an upper or flying position, or a lower or road position when it is no longer in rotation.

This mobility is obtained by deforming the triangular pyramid which carries the rotor and a post of which is telescoping for that purpose.

The various controlling operations for the rotor and essentially the raising of this latter, the spreading of the blades and the starting, are preferably obtained by the use of a single control which is so arranged that these operations will follow automatically in the proper order.

In conformity with my invention, the control system for the rotor is so arranged that the resistance couples corresponding to the control operations to be effected will increase in value in the same direction as the order of succession of the said operations, and a stop which is located at the end of the stroke of each operation will provide positively for the succeeding operation.

In this manner, when the rotor is thrown on, the couple which is brought upon the aggregate of the devices cannot exceed the smallest of the resistance couples, and it is only when the operation corresponding to the smallest couple has been completed that the aforesaid stop will provide for the operation corresponding to the next resistance couple.

In one embodiment, the raising of the rotor is obtained by the relative rotation of a screw relatively to a nut, a stop fixed upon said screw being adapted to cooperate with said nut the pitch angle of said screw being preferably such that said latter can be rotated by axial movement of the nut.

The spreading of the blades and the starting of the rotor are preferably obtained by means of a driving plate, comprising studs adapted to cooperate on the one hand with stops rigid with a further plate connected by links or the like to the blades adapted to be folded up, and on the other hand with stops rigid with the hub of the rotor, the said fingers making only contact with the last stops providing for the starting of the rotor after the said further plate has made a sufficient rotation for providing for the spreading out of the blades.

The change from the flying position to the road position is effected by means of a brake which holds the rotor in place; due to the inclination of the axis to the rear, the blades will be automatically folded up and a brake or the like will then provide for the descent of the whole arrangement.

A third series of particular dispositions in the apparatus relates to the lifting blades and these, in order to reduce the length of the apparatus on the road and hence to diminish the danger which may be particularly occasioned by side gusts of wind, have a length which is shorter in the idle position than in flight.

For this purpose, each blade is made in at least two parts of about the same length, which are in line during the flight and are adapted to be mutually displaced in such way as to reduce the length of the whole device when the apparatus is transformed into a road vehicle.

In a preferred form of construction, the part of the blade which is farthest from the axis of rotation is slidable in the other part; a resilient member constantly urges the slidable part of blade towards said axis, and the device is brought into the working position and is held in this position by the action of the centrifugal force.

A fourth series of particular dispositions in the apparatus relates to the driving means which are adapted to drive at will from the motor the propeller, the propelling means when on the road, or the rotor, when starting this latter. The control of the propeller is preferably such that the latter may be thrown on or off the motor at will, and may be stopped in a given position, which is preferably the horizontal position, in order that it will not be too near the ground when on the road.

For this purpose, the propeller coupling comprises a device for progressive driving, a device for gradual braking by friction, a device for positive drive and a device for holding the propeller in a suitable position.

In conformity with the invention, the propeller is driven by two cooperating members which are slidable with reference to each other; one of these members participates in the rotation of the propeller and the other participates in the rotation of the driving shaft. These two members comprise, on the one hand, tapered bearing parts, and on the other hand, projections or the like by which they can be connected together, and thus the aforesaid sliding movement serves to drive the propeller either positively or gradually.

Furthermore, a movable braking member may be mounted in contact with a suitable surface in order to brake the propeller, or it may be inserted into a notch in order to hold the propeller in place.

A fifth series of dispositions relates to the control and this is so arranged that the hand-wheel will also serve for the control of height in flight, in a known manner, by inclining the axis of the rotor, and for the control of direction when on the road or in flight.

The apparatus is completed by controls by which the various operations can be performed from the cockpit.

Other special dispositions, characteristics and advantages of the invention will be set forth in the following description relating to an embodiment of the invention, with reference to the accompanying drawings which are given solely by way of example.

Fig. 1 is an elevational view, with parts broken away, of the apparatus in the flying position.

Figs. 2, 3 and 4 are respectively side, front and plan views of the apparatus after its transformation into a road vehicle.

Fig. 5 is a plan view of the steering gear of the vehicle.

Fig. 6 is a section through a suspension post of the apparatus in which, for the better comprehension, the diametrical proportions have been increased with reference to the longitudinal proportions.

Fig. 7 is a view similar to Fig. 6 corresponding to another position.

Figs. 8 and 8' are diagrammatic views showing the principle of the suspension of the apparatus.

Fig. 9 is a plane view with part of a blade broken away.

Fig. 10 is a corresponding perspective view with parts broken away.

Fig. 11 is a sectional view showing a form of the rotor.

Fig. 12 is a corresponding partial plane view.

Fig. 13 is a sectional view showing the mechanism for driving the propeller.

Fig. 14 is a partial section on the line XIV—XIV of Fig. 13.

In the form of construction herein represented, the apparatus comprises a main body ending at the rear in a stationary vertical fin 1 and a stationary tail plane 2. It is provided at its front end with a propeller 3 and comprises a fore carriage with guide wheels 4 provided with a streamline device 5, a rear driving wheel 6 and a rotor 7 which is mounted at its upper part, at the top of a pyramid.

The motor 8 is mounted at the front of the apparatus. It drives the propeller 3 directly by means of a coupling 10 which will be further described, while on the other hand it drives a change-speed box 11 through the medium of the bevel-gearing 13 and the vertical transmission device 14. The change-speed box 11 is arranged for at least two speeds and back drive, and it actuates the rear driving wheel 6 or the rotor 7.

The connection with the rear wheel 6 is assured by a Cardan shaft 15 and a bevel gear set 16, and the connection with the rotor 7 is assured by a connection disposed within two telescoping tubes 17 and 18.

To facilitate the description, I will further set forth the various characteristic dispositions which are the most important and which distinguish the apparatus from the known autogyros, and will also indicate their cooperation as well as the means for driving the same from the pilot's place.

*Landing gear and suspension device*

Fig. 1 shows the apparatus with the landing gear in the flying position. This apparatus is substantially inclined towards the rear. The horizontal visibility is diminished. The center of gravity is somewhat high. It is thus necessary, in order to transform it into a road vehicle, to stop the propeller 3 in its horizontal position and to lower the front part of the apparatus in such way that the latter will occupy the position shown in Figs. 2 to 3.

For this purpose, the landing gear consists essentially of a tubular axle 20 of streamlined shape to each of whose ends is pivoted a respective reaction strut 21 which is also pivoted to the chassis in such manner as to absorb the longitudinal stresses and two suspension posts 22, substantially vertical, rigid with said axle, are pivoted to the motor frame and are adapted to absorb the braking torque.

Each suspension post 22 has two operating lengths, one corresponding to the flight and the other to the road travel, and each is so arranged as to assure, for these two positions, suspensions having different characteristics.

Figs. 8 and 8' illustrate the principle of the suspension according to the invention; Fig. 8 corresponds to the flying suspension and Fig. 8' corresponds to the road suspension.

In both cases, the suspension is assured by a piston 23 movable in a cylinder 24 containing compressed air, and it is evident that the volume of compressed air which provides for the suspension will confer to the latter a greater or less degree of ease and the pressure of the air will remain constant at rest, as it depends only upon the weight of the apparatus. For obtaining with the same organ the two suspensions and the lifting, a certain quantity of liquid 25 is placed in the lower part of the cylinder body 24, and on the other hand, a chamber 26, termed secondary casing, is formed within the piston 23, and it may be connected or not with the primary casing consisting of the said cylinder which is situated below it, by a valve 27.

In the flying position (Fig. 8), the valve 27 is closed and the secondary casing 26 is not connected with the cylinder and thus only the air between the layer of liquid and the lower surface of the piston will participate in the suspension.

In the road position (Fig. 8'), the secondary casing 26 is connected with the cylinder and the quantity of compressed air which it contains will thus participate in the suspension.

For the travel on the road (Fig. 8'), the relative position of the parts is such that the distance from the lower end of the piston 23 to the end of the cylinder 24 is substantially equal to the stroke of the suspension.

For the landing, the volume of air participating in the suspension is increased by the volume of the cylinder 24 corresponding to the lifting stroke, and diminished, on the one hand by the volume of the liquid 25 and on the other hand by the volume of the secondary casing 26.

This will afford, in either case, volumes of air corresponding to appropriate suspensions, and it will be noted that it is sufficient to admit air into the cylinder in order to change over from the road position to the flying position.

Figs. 6 and 7 show a construction of a suspension post of the type described, Fig. 6 representing the flying position and Fig. 7 the road position.

The device consists of a cylinder body 24 which is secured to the axle 22 (Fig. 5) and in which is movable a tubular piston 23 linked to the motor frame. Leakless conditions are obtained by the use of a pressed leather piece 28 and a certain quantity of oil is placed at the bottom of this body. The secondary casing is formed within the said cylinder forming the primary casing by a tube 29 which is pierced at its lower end with slots 30 adapted to provide for the communication of said casings for the road suspension.

Any passage of air from said primary casing into said secondary casing is cut off during the flying by a packing device consisting of two pressed leather pieces 31 and 32 or the like, which are mounted on rod 33 secured to the tubular piston 23. The tube 29 is subjected to the action of a spring 35 bearing against the rod 33 and urging it downwardly in such way as to break all connection between the two casings, this movement being limited by an inner shoulder 36 formed on the tube 29.

The rod 33 carries at its upper part a valve 37 whose head 38 extends outwardly. This head 38 is arranged so as to open the valve 37 against a spring 40 when the rod is lowered below a certain level after the slots 30 have been uncovered.

Two conduits, one of which, 42, is connected with the valve 37, and the other, 43, is connected with the closing member 32, lead to a three-way cock 44 which is located in front of the pilot and is adapted to connect the said conduits with the atmosphere (by the conduit 45) or with a compressed air tank (46 in Fig. 1), by the conduit 47.

The whole arrangement is completed by a hydraulic shock-absorber of a known type, which is distinct from the suspension itself, and serves to prevent the jumping of the apparatus. This shock-absorber consists of a piston provided with a valve 48, whose rod 49 is preferably secured to the bottom of the cylinder 24 and cooperates with a cylinder 50 full of liquid, which is provided in the rod 33 itself, at the central part of the said cylinder.

The operation is as follows:

In the flying position as shown in Fig. 6, the cock 44 is in the position represented and the interior of the casing 26 is connected by the piping 43 with the intake of compressed air. The closing rod 33 is now in its upper position and thus there is no other connection between the two casings but through the two leather members 31—32 which only allow the compressed air to circulate in one direction. Thus the air contained in the secondary casing 26 does not participate in the suspension, and the connection between this casing and the supply, which is constantly maintained, only serves to compensate for the leakage.

In order to change over to the road position, the piping 43 is connected with the exhaust. The valve 37 is lifted by the air pressure and the entire casing is emptied; the weight of the apparatus causes the piston 23 to descend. This latter descends to a point below the position shown in Fig. 7 and thus the two casings will communicate through the slots 30 and the valve 37 will be held open, owing to the contact between its head and the inner surface of the tube 29.

The cock 44 is then turned in order to connect the tube 42 with the intake of compressed air.

This air fills the two casings and it raises the piston 23 to the position shown in Fig. 7, in which position the valve 37 is released and cuts off the supply of compressed air.

The chassis is now maintained at a constant height above the ground, as the leakage is compensated by an intake of air due to the opening of the valve 37 under the effect of the tube 29, as soon as the piston 23 tends to descend.

On the other hand, the whole of the air contained in the chamber is now utilized for the suspension.

Steering

The axle 20, which is tubular and streamlined, carries at its ends the journals of the wheels 4.

Within this axle 20 is contained the steering gear, which consists of a gear-wheel 52 cooperating with a rack 53 connected by ball-and-socket joints 54 pivoted to bars 54 pivoted to rods 55 controlling the direction of the wheels 4. The rotation of the vehicle wheel 52 is controlled by the handwheel 60 with which the vehicle wheel is connected by Cardan joints or the like connected by two sliding tubes 56—57 provided with flutings.

As shown in a greater scale on Fig. 11, the hub 51 of the rotor is mounted in ball bearings in an inclinable support 62 which is pivoted to the axle-pin 63 at the top of the triangular pyramid formed by the device consisting of the telescoping tubes 17—18, which are pivotally mounted on the change-speed box and of two stays 65 mounted on fixed pivots 66 (Fig. 1).

The sails of the rotor consist of two blades 72, each of whose arms is mounted on the hub by means of a horizontal pivot 74 (Fig. 11) and of a vertical pivot 75 (Fig. 12), and of a blade 76 whose arm is mounted only on a horizontal pivot. The two blades 72 may be folded about the said vertical pivots so that the whole device may take the position shown in Figs. 2, 3 and 4. A disc 77, actuated by the shaft 78, either directly or indirectly through a planetary speed-reduction device, as will be further disclosed, carries studs 79 cooperating on the one hand with stops 80 mounted on a plate 81 and on the other hand with stops 82 mounted on the hub 61.

Upon the plate 81 are pivoted, by ball-and-socket joints, two rods 84 which may be elastic and are pivoted by other ball-and-socket joints to the blades 72, said stops 80 being so arranged that the studs 79 will come against them before making contact with the stops 82 of the hub 61.

The control of the lifting, the unfolding and the starting of the rotor is obtained from the motor, and it is combined in such manner that the resistance couples corresponding to these three operations, and possibly to other operations intervening, shall proceed in an order of increase which is as marked as possible, and a stop device used for the end of the movement will correspond to the completion of an operation coinciding with the commencement of the next operation corresponding to a couple whose value is immediately above the former.

For this purpose, the power is transmitted from the change-speed box 11 to the shaft 83 which is provided with one or more screwthreads adapted for reversible screwing into a nut mounted on the tube 85. The direction of the thread is such that the rotation of the shaft 83, by an unscrewing effect, will raise the tube 85 together with the rotor until it abuts against the head 84 of the shaft 83. The pitch angle is such that the screw can be rotated by axial movement of the nut. Obviously, the resistance couple corresponding to the rise of the nut is less than the resistance couple of the other operations.

The tube 85 will thus actuate the shaft 78, by means of the Cardan joint 86. This shaft 78 drives as above indicated the disc 77 whose studs 79 will first come against the two stops 80 on the triangular plate 81. As shown in Fig. 12, a rotation of the plate 81 in the direction of the arrow will open out the blades 72, before the rotor device is set in rotation, due to the effects of gravity and of inertia of the blades 72 which are less than those of the rotor as a whole.

It is only when the blades 72 are opened out, that the studs 79 will come against the stops 82 of the rotor hub and will thus cause the rotation of this latter.

When changing over from flying to road conditions, the operations are distinct from one another, and these are preferably effected as follows. A brake band 90, surrounding the cylindrical part of the rotor hub 61, provides for the stopping of this latter preferably with the blade 76 in the rearward direction. In these conditions, by inclining the rotor shaft entirely to the rear, the action of gravity will be sufficient to fold up the blades 72. As concerns the descent of the rotor, use is made of a lowering brake consisting of a lever 91 which is provided with a shoe 92 and a stud 93 and is mounted on the lower end of the movable tube 18. The weight of the lever or preferably the effect of a spring will serve, at the end of the rising movement of the rotor, to hold the tubes 17—18 in place by the insertion of the stud 93 into a notch in the tube 17. For the descent of the rotor, an upward movement of the lever 91 will release the stud 93 and will strongly press the shoe 92 against the tube 67, and thus the rotor will only descend according as the end of the lever 91 is allowed to descend, and this takes place without any great effort on the part of the operator.

Telescoping blades

In the form of construction represented in Figs. 9 and 10, each rotor blade consists of a hollow half-blade 98 pivoted to the arm 73, and of a half-blade 99 which is slidable in the first-mentioned half-blade, the friction being reduced to a minimum by the use of rollers 100—101. A stretcher or elastic cord device 102 connects the outer end of the half-blade 99 to the inner end of the half-blade 98. It is evident that the action of centrifugal force will have a preponderating effect on the starting of the rotor, and that the half-blade 99 will be driven outwardly, and thus it will serve for the lifting of the apparatus. Inversely, when the rotor is braked, the blades will be automatically telescoped under the action of the stretcher 102 when the said rotor falls below a determined speed.

An important feature of the construction of the blades consists in the abutment when in the operating position, which should be such that no play will be allowed when in flight, as this would cause dangerous vibrations.

In order to provide for an abutment without the least play, it is obtained by fitting, without jamming two dihedral angles one within the other. Said dihedral angles are advantageously separated into two parts, in order to increase the fitting length and their surfaces are disposed between the two entering edges 103 of the blades on the one hand and the two trailing edges 104 on the other hand.

There are thus provided a male bar 107 on each edge of the movable half-blade, having at each end two inclined planes 105 and 105' and two female bars 108 mounted on the stationary half-blade 98. The female bars 108 may consist of several parts in order to facilitate the machine treatment. The male and female bars are accurately adjusted before mounting in such way that the contact made with the inclined planes will take place in an exact manner at both ends.

In the case of a defect in the parallel position of the bars, a slight distortion will be produced, which is compatible with the flexibilty of the blades.

*Propeller coupling device*

The propeller coupling device 10 is intended to allow the pilot to obtain at will either a progressive driving of the propeller by friction, a positive driving, a progressive braking by friction, or a stopping in a given position, which is usually the horizontal position, in order that the apparatus may be lowered without inconvenience.

In the form of construction shown in Figs. 13 and 14 in which it is supposed that the propeller 3 is perpendicular to the plane of the figure, the propeller coupling device comprises a sleeve 110 which carries the propeller and is secured, by means of a tapered bearing part, to the end of the crankshaft 112 in the place of the usual propeller hub. The said sleeve 110 is provided with flutings 111 by which it constantly drives the movable coupling device 113 whose sliding is effected by a fork 114. The propeller hub 115 is rotatable by means of bronze rings 116 on the sleeve 110. It is secured to the propeller and to the driving disc 118. The sliding device 113 and the disc 118 comprise tapered bearing portions 119 and flutings 120 which are so arranged that the sliding device will move the disc and the propeller either by the friction of the tapered parts 119 when it is driven to the front, or by the flutings 120 which come into engagement when it is driven to the rear. The disc 118 also comprises two shoulders, one of which, 121, is continuous and the other, 122, is interrupted by the notches 123. A movable stud 124 is so arranged that it will either brake the propeller by friction upon the continuous shoulder 121, or will stop the same in a given position when it is inserted into a notch 123. This stopping device may be made to depend upon a safety device, provided with a spring or the like, which prevents an abnormal stress on the end of a blade from breaking the support 125 of the movable stud.

Rods 130 and 131 lead to the cockpit and permit to displace the sliding device or to control the movable stud 124.

*Controlling devices*

It has been observed from the preceding considerations that the rise and descent of the rotor and of the landing gear, and the starting of the propeller, can be controlled from the cockpit, by acting upon the change-speed box, upon the cock 44 located in front of the pilot, and upon the rods 130 and 131.

On the other hand, the hand-wheel 60 serves for the steering, as above disclosed, the steering being effected when on the ground by means of the steering wheels 4, and when in flight, due to the streamline arrangement 5 of these wheels, which now serve as rudders. The hand-wheel 60 is mounted at the end of a tube 132 pivoted by means of a Cardan joint 68 to the tube 57 and connected on the other hand with the inclinable support 62 of the rotor by a strut 133 pivoted to the frame a bar 134, a countershaft 135 and telescoping bars 136 and 137.

This arrangement permits to control the inclination of the axis of the rotor and hence the rise and descent, by moving the hand-wheel to the front or rear.

The telescoping bars 137 and 136 are fastened together by a pin or the like when flying and on the other hand the strut 133 is fastened with reference to the frame during the travelling on road.

The apparatus is completed by safety devices of any suitable type, by which all errors of operation are avoided.

While I have described what I at present consider preferred embodiments of my invention, it will be obvious to those skilled in the art that various changes and modifications may be made without departing from my invention and I therefore aim in the appended claims to cover all such changes and modifications as fall within the true spirit and scope of my invention.

What I claim is:

1. In an autogyro apparatus, a body, a rotor, at least one post attached on the body for supporting said rotor, said post including two members in slidable engagement, one of said members being pivoted to said body and the other to said rotor, control means for sliding said members one with reference to the other to reduce the size of the apparatus.

2. An autogyro apparatus as claimed in claim 1 wherein one of said members is screw threaded and the other is tubular and includes a nut adapted to cooperate with said screw threaded member, means for driving one of said shafts, a stop fixed upon said screw threaded shaft and adapted to limit the lengthening motion of said post.

3. An autogyro apparatus as claimed in claim 1 wherein one of said members is provided with a screw thread and the other is tubular and includes a nut adapted to cooperate with said screw threaded member, the pitch angle being such that the screw can be rotated by axial movement of the nut, means for driving one of said members, a stop fixed upon said threaded member and adapted to limit the relative sliding motion in the direction corresponding to the lengthening of the post, a tube surrounding said screw threaded member, means connected with said tube for braking the telescoping motion of the post corresponding to the reduction of its length.

4. In an autogyro apparatus, a body, a motor, a rotor including an actuating shaft, at least one post adapted to support said rotor, said post including a screw threaded shaft, a nut adapted to cooperate with said shaft, the pitch angle being such that the screw can be rotated by axial movement of the nut, a tubular member connected to said nut, a stop carried by said screw threaded shaft and adapted to limit the lengthening motion of said post, driving means, one end of said tubular member and screw threaded shaft being connected to said driving means and the other to said actuating shaft, the resisting torque corresponding to the starting of the rotor being greater than the torque corresponding to the lengthening of said post.

5. An autogyro apparatus as claimed in claim 4, including two further posts adapted to support the rotor.

6. In an autogyro apparatus, a body, an engine, a rotor, at least one post attached to said body for supporting said rotor, said post including at least two members in sliding engagement, one of said members being attached to said body and the other to said rotor, a screw and nut contrivance operatively connected to said members and adapted to cause a sliding motion of one of said members with reference to the other, a stop adapted to limit said sliding motion, transmission means between said engine and said contrivance for operating said latter, a connection between said contrivance and said rotor and adapted to start the rotor, the resisting torque corresponding to the sliding of said members in the direction corresponding to an upward movement of the rotor being smaller than the resistance torque corresponding to the starting of the rotor.

7. An autogyro apparatus as claimed in claim 6, in which the pitch angle of said screw and nut contrivance is such that the screw can be rotated by axial movement of the nut.

8. In an autogyro apparatus, a body, an engine, at least one post, a rotor pivotally supported by said post, said post being swingingly carried by said body to swing the rotor substantially in the vertical and longitudinal median plane of the apparatus, a screw and nut contrivance connected respectively to said body and to said rotor to swing said post and reduce the high of the apparatus, transmission means between said engine and said contrivance and adapted to operate said latter and to thus displace the rotor in the upward direction, a connection between said rotor and said contrivance adapted to start said rotor, a stop adapted to limit the displacement of the rotor in the upward direction, the resisting torque corresponding to said displacement of the rotor being smaller than the resisting torque corresponding to the starting of the rotor.

9. In an autogyro apparatus, a body, an engine, at least one post, a rotor pivotally supported by said post, said post being swingingly carried by said body to swing the rotor substantially in the vertical and longitudinal median plane of the apparatus, a screw and nut contrivance connected respectively to said body and to said rotor to swing said post and reduce the high of the apparatus, the pitch angle of said contrivance being such that the screw can be rotated by axial movement of the nut, transmission means between said engine and said contrivance adapted to operate said latter and to thus displace the rotor in the upward direction, a connection between said rotor and said contrivance adapted to start said rotor, a stop adapted to limit the displacement of the rotor in the upward direction, the resisting torque corresponding to said displacement of the rotor being smaller than the resisting torque corresponding to the starting of the rotor.

ANDRÉ THAON.